(12) United States Patent  
Lim

(10) Patent No.: US 6,939,020 B2  
(45) Date of Patent: Sep. 6, 2005

(54) BACK LIGHT FOR LIQUID CRYSTAL DISPLAY

(75) Inventor: Moon Jong Lim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 68 days.

(21) Appl. No.: 10/163,416

(22) Filed: Jun. 7, 2002

(65) Prior Publication Data

US 2003/0035283 A1 Feb. 20, 2003

(30) Foreign Application Priority Data

Aug. 16, 2001 (KR) ........................................ 2001-49305

(51) Int. Cl.$^7$ ............................................. G09F 13/04
(52) U.S. Cl. ........................ 362/97; 362/225; 362/252; 362/260; 349/70
(58) Field of Search ..................... 362/97, 225, 240, 362/252, 260; 349/70

(56) References Cited

U.S. PATENT DOCUMENTS

| | | | | |
|---|---|---|---|---|
| 4,943,689 A | * | 7/1990 | Siefer et al. | ................... 362/97 |
| 5,457,615 A | * | 10/1995 | Nezer | .......................... 362/260 |
| 5,975,722 A | | 11/1999 | Van Duijneveldt | |
| 6,674,250 B2 | | 1/2004 | Cho et al. | |

| | | | |
|---|---|---|---|
| 2001/0050850 A1 | * | 12/2001 | Plunk .......................... 362/225 |

FOREIGN PATENT DOCUMENTS

| | | |
|---|---|---|
| DE | 19851785 A1 | 5/2000 |
| GB | 2207496 | 2/1989 |
| JP | 57-098987 | 6/1982 |
| JP | 60-254182 | 12/1985 |
| JP | 02301793 A | 12/1990 |
| JP | 03015105 | 1/1991 |
| JP | 3-586687 | 7/1991 |
| JP | 10-143089 | 5/1998 |
| JP | 2000310778 | 11/2000 |
| JP | 2000-338487 | 12/2000 |
| JP | 2000338487 A | 12/2000 |
| JP | 2000-356959 | 12/2000 |
| JP | 2001210126 | 8/2001 |
| KR | 2001-0074027 | 8/2001 |

* cited by examiner

*Primary Examiner*—Stephen F Husar  
(74) *Attorney, Agent, or Firm*—McKenna Long & Aldridge LLP

(57) ABSTRACT

A back light includes a first case having a plurality of first and second support members, the first support members at ends of the case and the second support member at a center portion of the case and a plurality of luminescent lamps having tubes supported by the first and second support members, having electrodes at both ends of the tubes. The luminescent lamps are arranged alternately at left and right sides of the second support member.

33 Claims, 7 Drawing Sheets

BACK LIGHT FOR LIQUID CRYSTAL DISPLAY

BACKGROUND OF THE INVENTION

This application claims the benefit of the Korean Application No. P2001-0049305 filed on Aug. 16, 2001, which is hereby incorporated by reference.

1. Field of the Invention

The present invention relates to a back light, and more particularly, to a direct type back light for a liquid crystal display (LCD) device.

2. Discussion of the Related Art

Generally, ultra thin sized flat panel displays having a display screen with a thickness of several centimeters or less, and in particular flat panel LCD devices, are widely used in monitors for notebook computers, spacecraft, and aircraft.

Since such an LCD device has no light source in and of itself, it needs a back light provided at the rear of a liquid crystal panel. Such a back light is used as a light source. Generally, as shown in FIG. 1, the LCD device includes a liquid crystal panel 5 comprising first and second substrates 2 and 4, a back light 7 at the rear of the liquid crystal panel 5, and one or more diffusing sheets 6 between the liquid crystal panel 5 and the back light 7.

The back light 7 used as a light source of an LCD includes a cylindrical luminescent lamp. The back light is divided into a direct type and a light-guiding plate type according to the position of the luminescent lamp. A back light is shown, for example, in U.S. Pat. No. 5,835,139, which is hereby incorporated by reference as if fully set forth here.

In the direct type back light, a luminescent lamp is arranged on the whole surface below a liquid crystal panel. To prevent the shape of the luminescent lamp from being displayed on the liquid crystal panel, it is necessary to maintain an adequate distance between the luminescent lamp and the liquid crystal panel. Moreover, a light-scattering mechanism is needed for uniform light distribution. In such case, however, there is a limitation to forming a thin sized back light.

As the size of the panel is enlarged, which is the trend, the light-emitting area of the back light increases. If the direct type back light has a large sized area, the light-scattering mechanism should have a sufficient thickness to make the light-emitting area flat. In this case as well, there is a limitation to forming a thin sized back light.

In the light-guiding plate type back light, a luminescent lamp is provided at a side edge and in the rear of a liquid crystal panel so that light is dispersed to all sides using a light-guiding plate. In this case, since the luminescent lamp is provided at a side edge and light must pass through the light-guiding plate, a problem of low luminance occurs. Also, for uniform distribution of luminous intensity, advanced optical design and processing technologies are required.

As shown, the direct type back light and the light-guiding plate type back light have respective problems. Therefore, a direct type back light is mainly used for an LCD device such as monitors for PC or TV which consider brightness more important than thickness, while a light-guiding plate type back light is mainly used for an LCD device such as notebook computers which consider thickness more important.

A related art direct type back light for an LCD device will be described with reference to the accompanying drawings.

FIG. 2 is a plane view illustrating a related art direct type back light for an LCD device. Referring to FIG. 2, the related art direct type back light includes a plurality of luminescent lamps 1 and an outer case 3 that fixes and supports the luminescent lamps 1. Also, a light-scattering mechanism (not shown) may additionally be arranged over the luminiscent lamps 1.

The light-scattering mechanism prevents a shape of the luminescent lamp from being displayed on a display screen of the liquid crystal display panel and provides a light source having uniform brightness distribution. To enhance the light-scattering effect, a plurality of diffusion sheets or a plurality of diffusion plates may be used.

The outer case 3 supports the luminescent lamp 1 and includes a reflecting plate in an inner side 3a. The reflecting plate is arranged to focus light emitted from the luminescent lamp 1 on the display of the liquid crystal panel, thereby enhancing light efficiency.

The luminescent lamp 1 is called a cold cathode luminescent lamp and acts as a light source of a liquid crystal display device, which emits light when a power source is applied to an electrode 1a arranged between both ends of the lamp.

However, the related art back light for a liquid crystal display device has several problems. A sustain voltage at both ends of the luminescent lamp becomes higher as the length of the luminescent lamp becomes longer. For this reason, a problem arises in that load is applied to an inverter. Also, a problem arises in that ozone (which has an undesirable smell) is generated by reaction between air and a material within the electrode due to high voltage.

To solve such problems, a device has been proposed in which a ground electrode 1b is formed at a middle portion of the luminescent lamp so that a voltage applied to the luminescent lamp can be reduced, as shown in FIG. 3. However, even though both sides around the middle portion have the same length, uniform discharge at both sides is still not actually generated. For this reason, a problem still arises in that luminance is not uniform.

SUMMARY OF THE INVENTION

Accordingly, the present invention is directed to a back light that substantially obviates one or more problems due to limitations and disadvantages of the related art.

An advantage of the present invention is to provide a back light that lowers a sustain voltage of a luminescent lamp.

Another advantage of the present invention is to provide a back light having a large-sized screen with uniform luminance.

Additional advantages and features of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these advantages and in accordance with the purpose of the present invention, as embodied and broadly described, a back light according to the present invention includes an first case having a plurality of first and second support members, the first support members at ends of a case and the second support member at a center portion of a case, and a plurality of luminescent lamps having tubes supported by the first and second support members, having electrodes at both ends of the tubes, wherein the luminescent lamps are arranged alternately at left and right sides of the second support member.

In another aspect of the present invention, a method of manufacturing a liquid crystal display device including a back light unit comprises forming a first case having a plurality of first and second support members, the first support members at ends of the case and the second support member at a center portion of the case; and forming a plurality of luminescent lamps having tubes supported by the first and second support members, having electrodes at both ends of the tubes, wherein the luminescent lamps are arranged alternately at left and right sides of the second support member.

In another aspect of the present invention, the luminescent lamps are arranged with the above structure so that the length of the luminescent lamps can be reduced to lower a voltage applied to both ends, thereby obtaining high luminance.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 1:
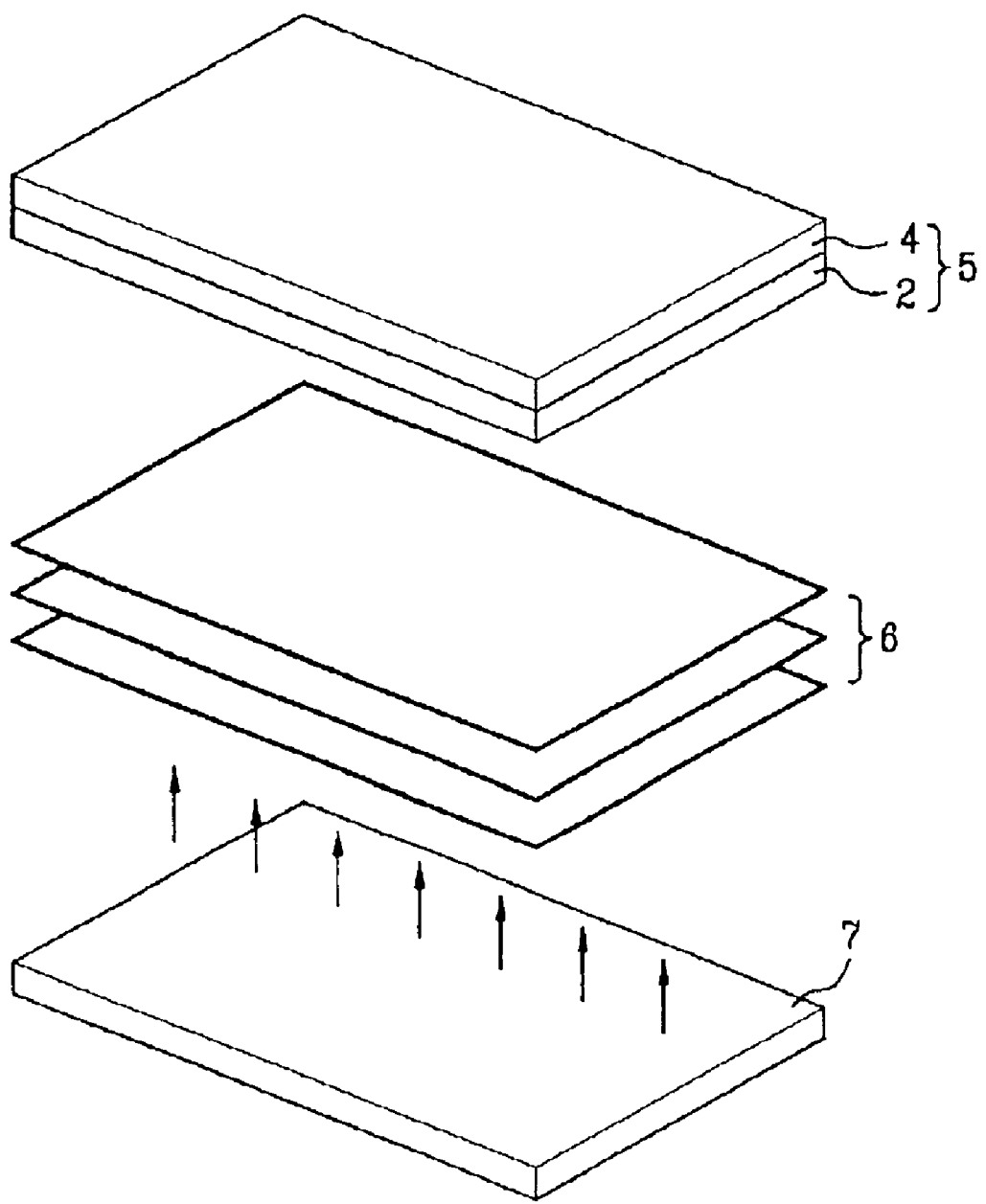
FIG. 1 is a perspective view of a general LCD device.
Figure 2:
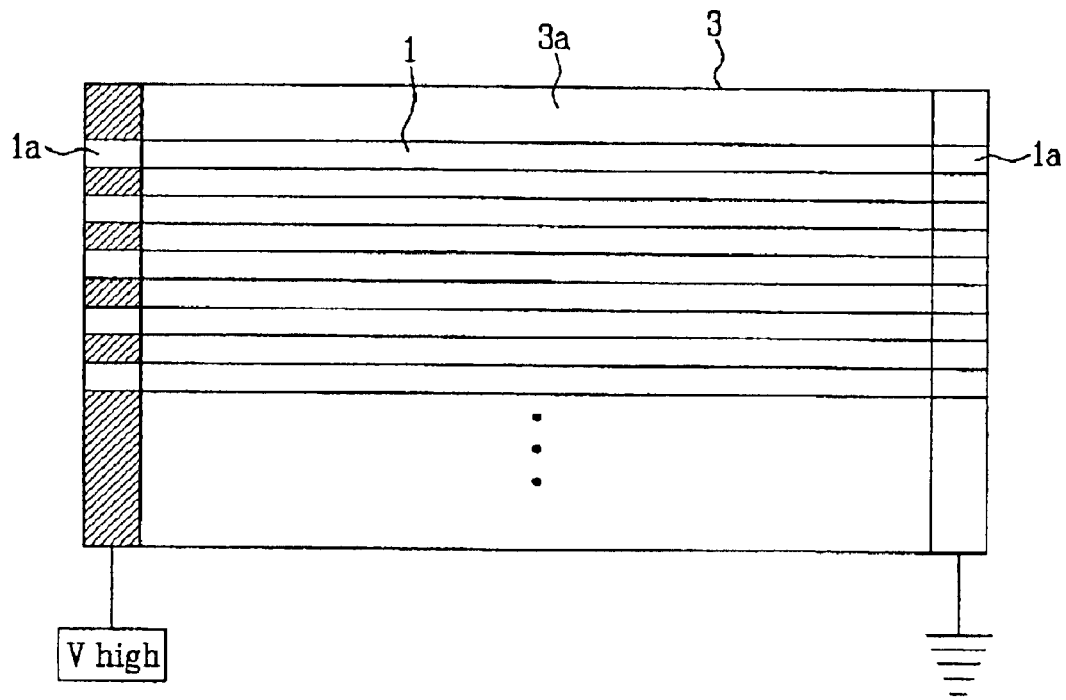
FIGS. 2 and 3 are plane views of a related art direct type back light.
Figure 3:
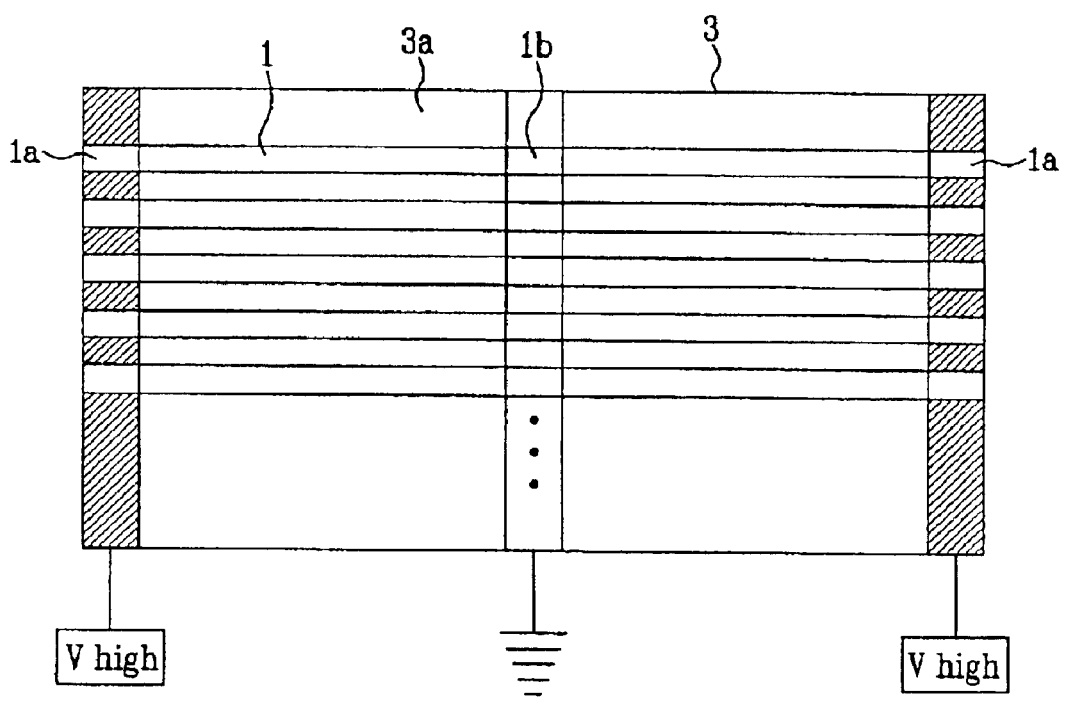
Figure 4:
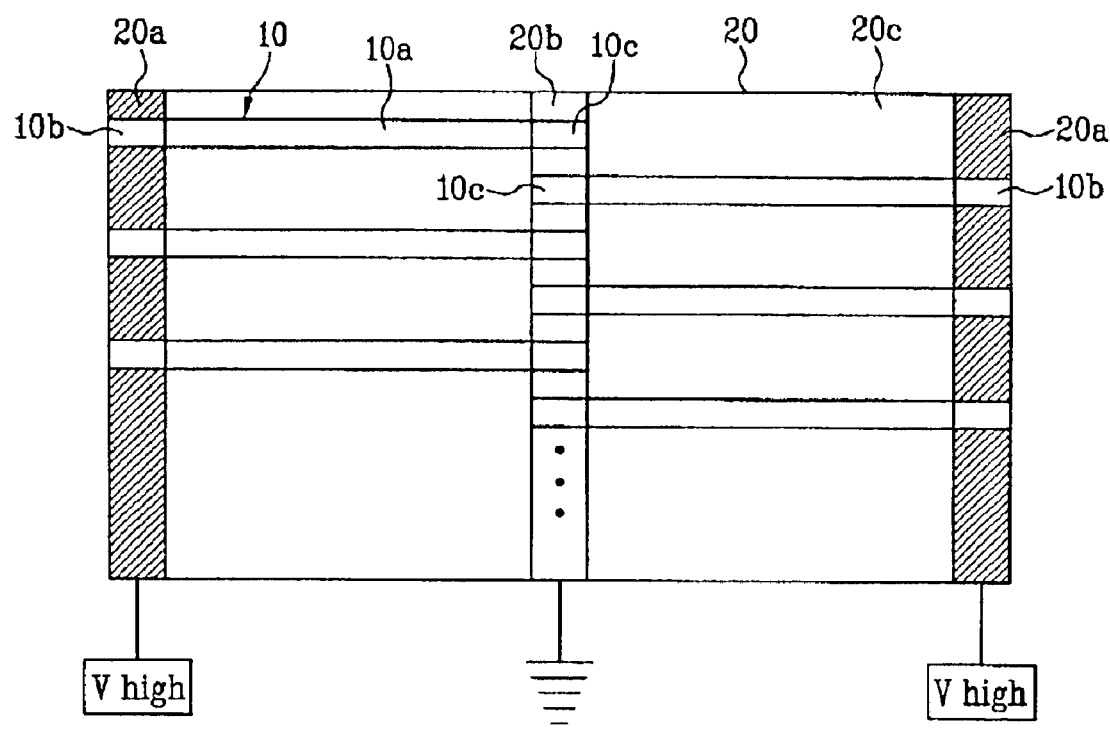
FIG. 4 is a plane view of a back light according to the first embodiment of the present invention.
Figure 5A:
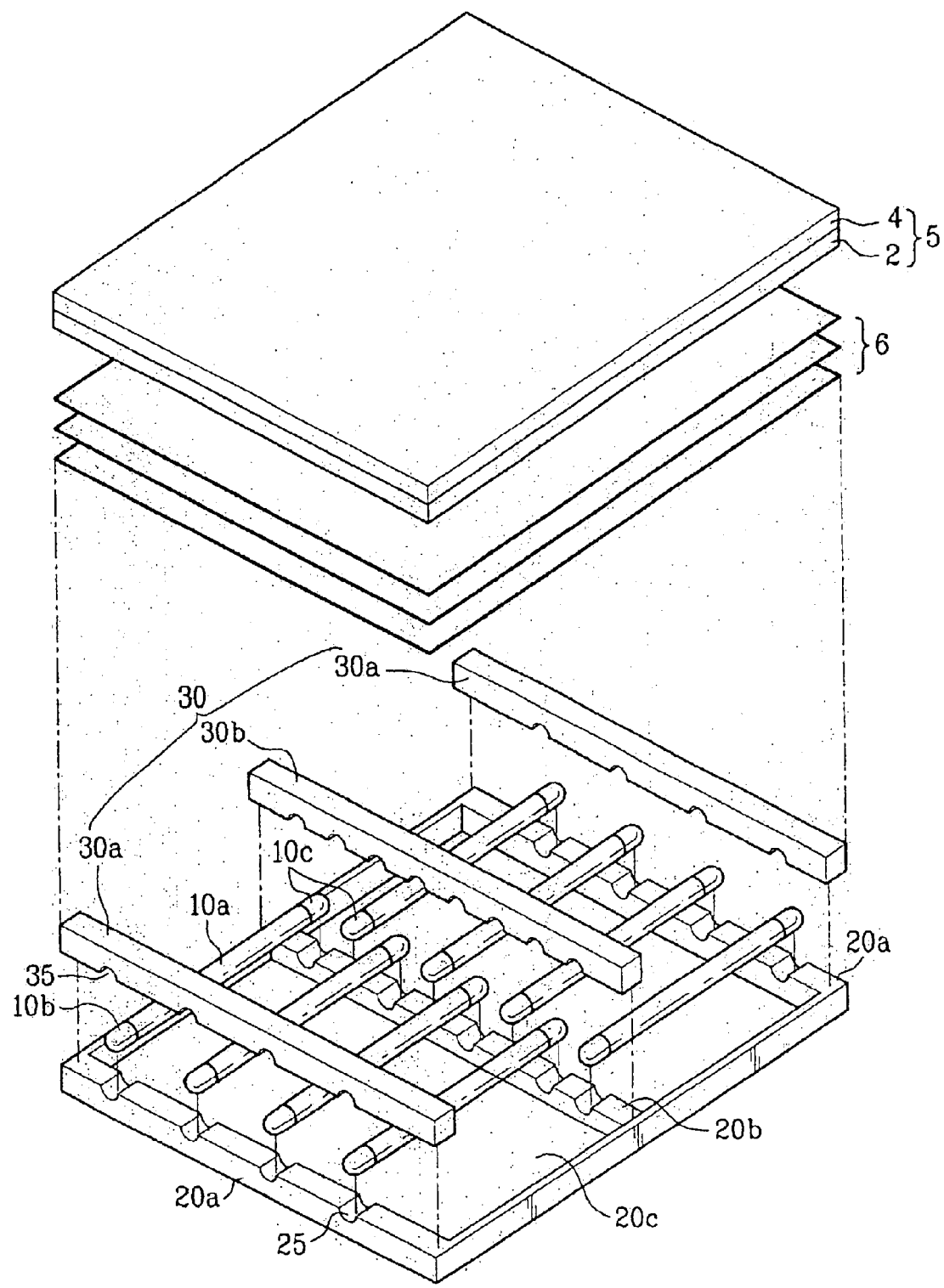
FIGS. 5A to 5C are perspective views illustrating various examples of a back light according to the first embodiment of the present invention.
Figure 5B:
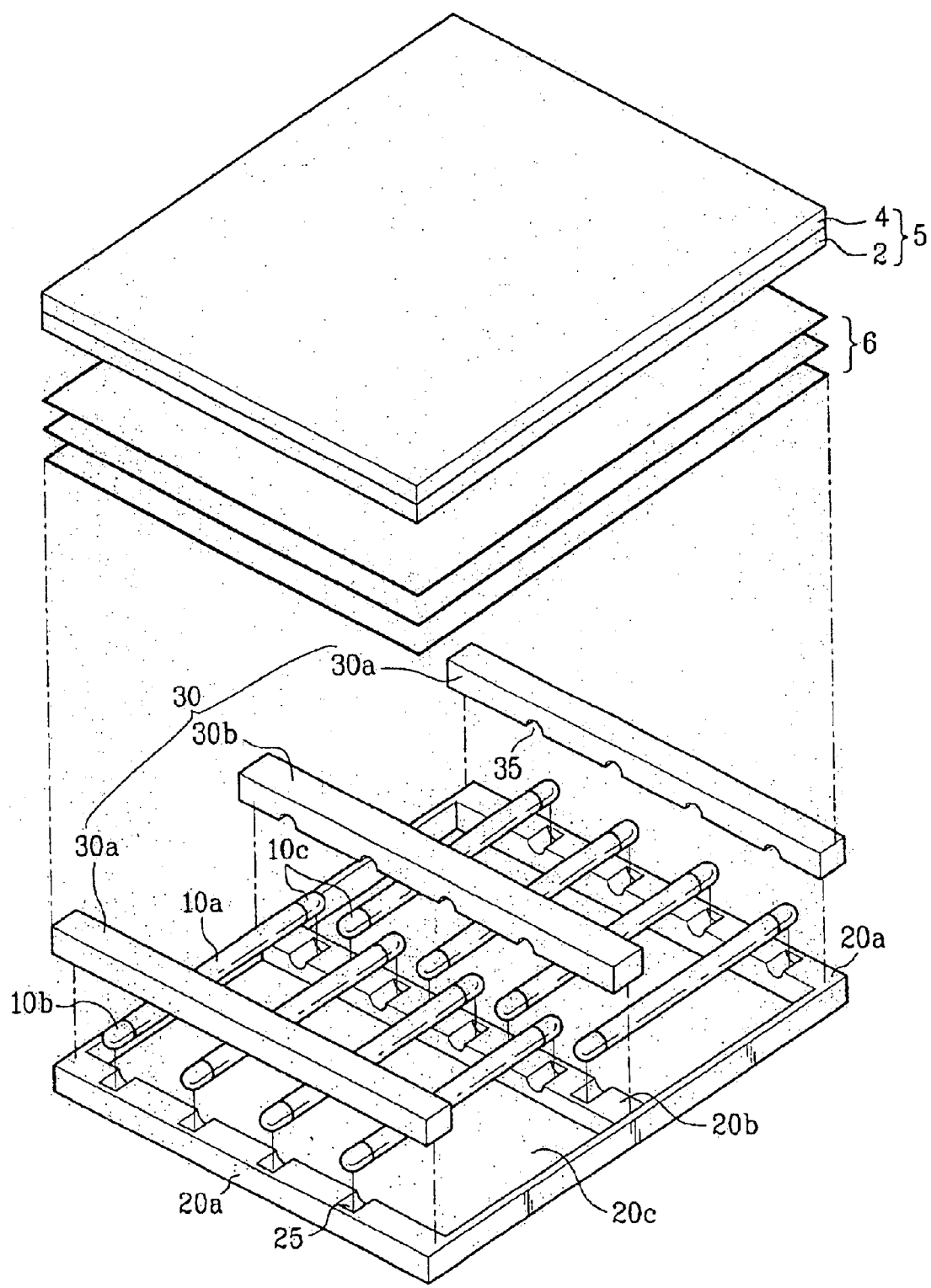
Figure 5C:
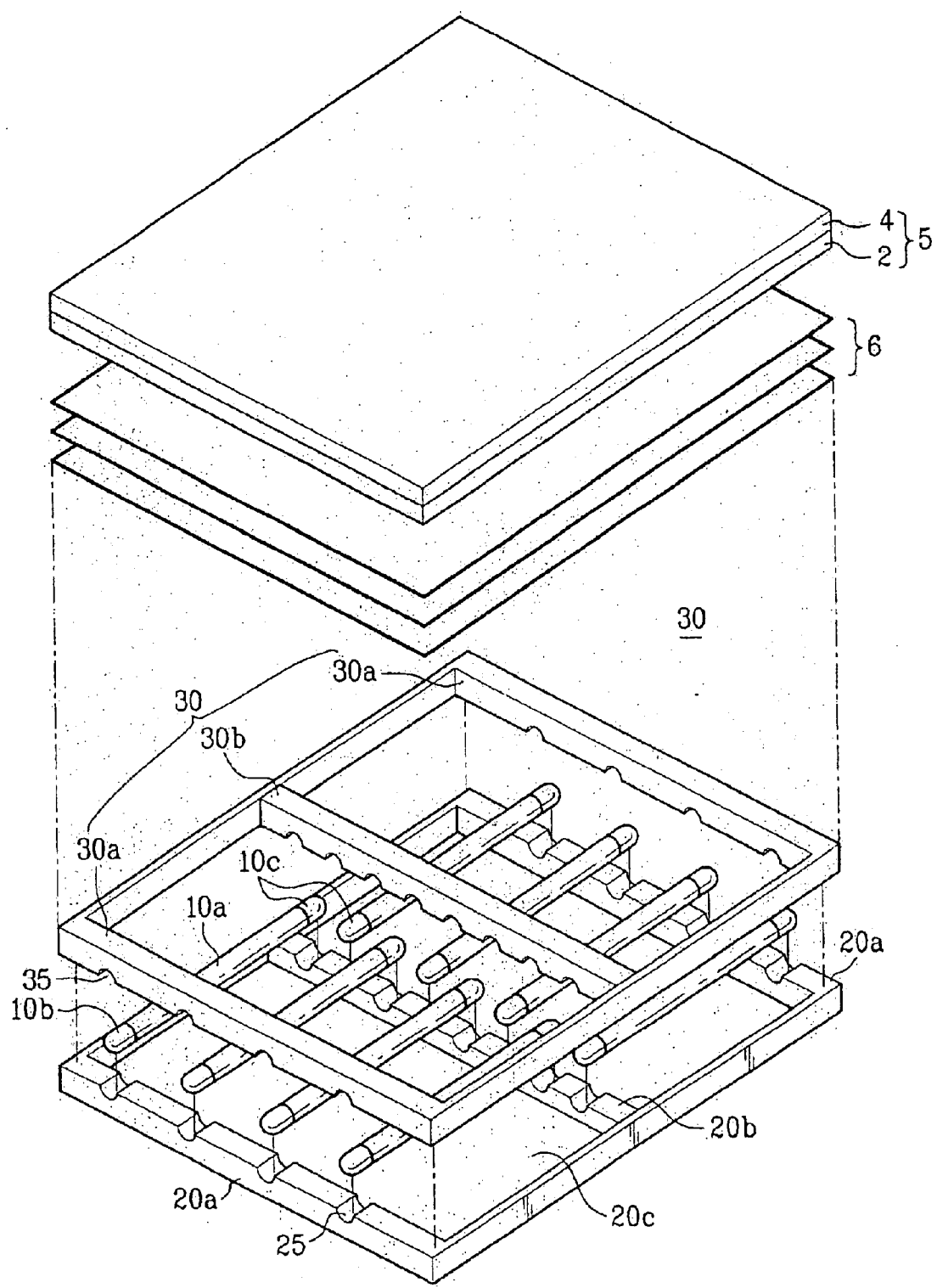

FIG. 4 is a plane view of a back light according to the first embodiment of the present invention, and FIGS. 5A to 5C are perspective views illustrating various examples of a back light according to the first embodiment of the present invention.

As shown in FIG. 4, the back light according to the first embodiment of the present invention includes a plurality of luminescent lamps 10 having electrodes 10b and 10c at both ends of an outside tube 10a, and a first case 20 which supports the luminescent lamps 10. First support members 20a and second support member 20b are formed respectively at both ends and center of the first case 20, so as to support the electrodes 10b and 10c of the luminescent lamps 10. The luminescent lamps 10 are arranged alternately at left and right sides of the second support member 20b. The second support member 20b is arranged in a straight line so that the electrodes 10c supported by the second support member 20b are also arranged in a straight line.

As described above, by arranging the luminescent lamps 10 at left and right sides of the second support member 20b, the length of the luminescent lamps 10 can be reduced by ½, thereby lowering a sustain voltage. Moreover, a voltage applied to both ends of the luminescent lamps 10 is preferably less than 2 kV (RMS voltage) to keep ozone caused by high voltage from occurring. Therefore, it is preferable that the luminescent lamps 10 have a length of about 400 mm to maintain the above voltage.

Furthermore, the first and second support members 20a and 20b that support the electrodes 10b and 10c of the luminescent lamps 10 are coated with a conductive material so as to apply power to the luminescent lamps 10. Therefore, no separate connector is required for each luminescent lamp, and power can be applied to all the luminescent lamps 10 by a power source line. The second support member 20b arranged at the center of the first case 20 to support electrode 10c of the luminescent lamps 10 is grounded. The first support members 20a arranged at both ends of the first case 20 to support the end electrodes 10b are connected to a power source line.

An inner side 20c of the first case 20 is formed of a light-reflecting material or is coated with a light-reflecting material. Thus, light generated from the luminescent lamps 10 can be focused on and directed to the display part of the liquid crystal panel.

A light-scattering mechanism (not shown) such as a diffusion sheet and/or a diffusion plate may be formed so that a light source is uniformly distributed on the display part of the liquid crystal panel above the luminescent lamps 10.

The first embodiment of the present invention will be described with reference to FIGS. 5A to 5C.

As shown in FIG. 5A, a hole or recess 25 is formed in the first support members 20a and the second support member 20b which constitute the first case 20. The luminescent lamp 10 is received in the hole 25. Here, the hole or recess 25 is formed entirely through the first support members 20a and the second support member 20b such that the electrodes 10b and 10c of the lamp are exposed.

Also, a second case 30 may be formed on the first case 20 so as to fix the first case 20 and the luminescent lamp 10. The second case 30 includes first bars 30a which fix one electrode 10b of the luminescent lamp 10 to the first support members 20a, and a second bar 30b which fixes the other electrode 10c of the luminescent lamp 10 to the second support member 20b. A hole or recess 35 is formed in the first and second bars 30a and 30b, similar to the hole or recess 25. Also, the first and second bars 30a and 30b may be coated with a conductive material.

FIG. 5B is a perspective view of another back light according to the first embodiment of the present invention. The back light of FIG. 5B is the same as that of FIG. 5A except for the hole or recess 25 formed in the first and second supports 20a and 20b and the hole or recess 35 formed in the first and second bars 30a and 30b. According to the back light of FIG. 5B, the holes or recesses 25 and 35 are formed such that sidewalls of the first and second supports 20a and 20b and sidewalls of the first and second bars 30a and 30b remain intact so as to not expose the electrodes 10a and 10c of the lamp. This may provide a more stable support for the luminescent lamp 10.

FIG. 5C is a perspective view of yet another back light according to the first embodiment of the present invention.

The back light of FIG. 5C is the same as that of FIG. 5A except for the second case 30. According to the back light of FIG. 5C, the second case 30 is formed to connect the first bars 30a to the second bar 30b to form a single body, similar to the first case 20.

The present invention contemplates different permutations and combinations of the features shown in FIGS. 5A to 5C including but not limited to the use of holes or recesses 25 and 35 in FIG. 5B to the first and second cases 20 and 30 in FIG. 5C.

Figure 6:
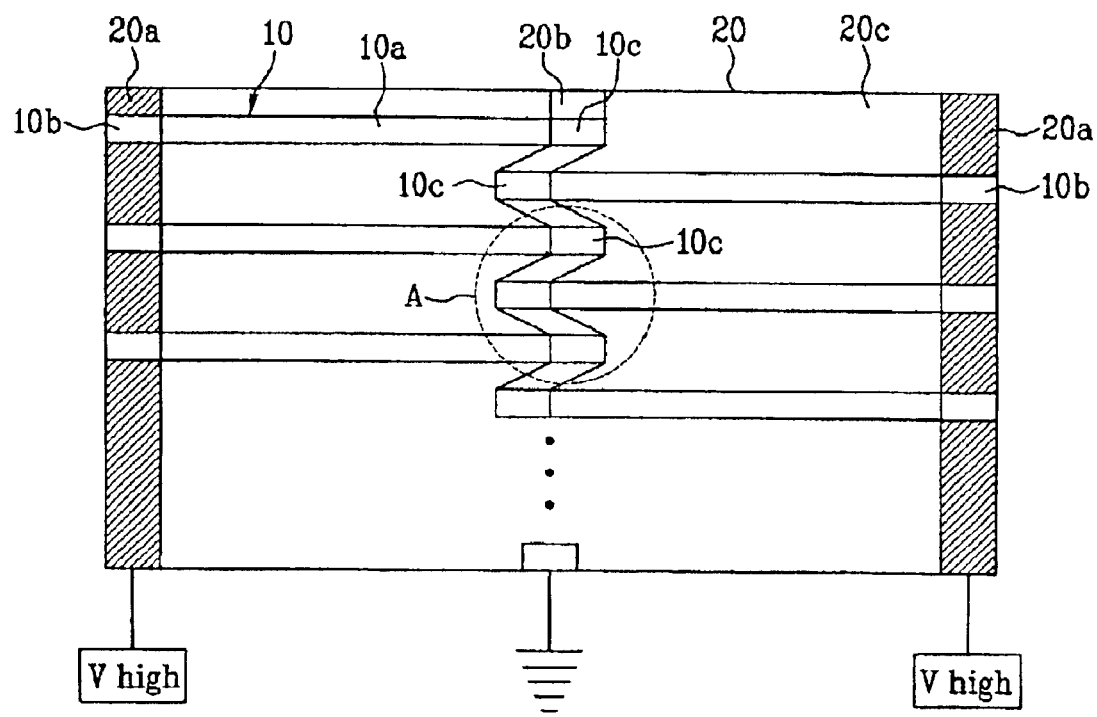
FIG. 6 is a plane view of a back light according to the second embodiment of the present invention.

FIG. 6 is a plane view of a back light according to the second embodiment of the present invention.

The second embodiment of the present invention is identical to the first embodiment except that the second support member 20b is formed at the center of the first case 20 in a zigzag pattern, and not a straight line. Therefore, the same reference numbers will be used throughout the drawings to refer to the same or like parts, and their description will be omitted.

In more detail, the luminescent lamps 10 are arranged so that the electrodes 10c supported by the second support member 20b are arranged in a zigzag pattern, and not a straight line.

The luminescent lamps 10 are arranged as described above, so as to minimize uneven luminance that may occur at the center portion of the back light.

Figure 7:
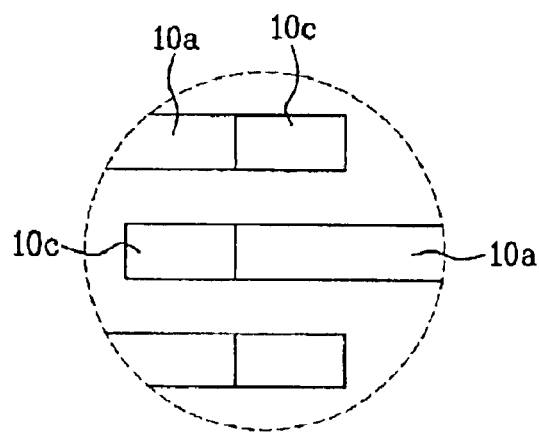
FIG. 7 is an enlarged view of a circle of FIG. 6.

Preferably, as shown in FIG. 7, it is intended that the luminescent lamps 10 are arranged to place boundary portions between the tubes 10a and the electrodes 10c of the luminescent lamps on the same line, thereby completely compensating for a light-emitting portion corresponding to the tubes 10a of the luminescent lamps and a non-light-emitting portion corresponding to the electrodes 10c of the luminescent lamps.

As aforementioned, the back light according to the present invention has the following advantages. Since the sustain voltage of the luminescent lamp can be lowered, it is possible to remove a problem caused by high voltage, i.e., an undesirable smell due to ozone. In addition, the back light of the present invention can be used for an LCD device having a large-sized screen while still achieving uniform luminance. Such large-sized displays include displays for televisions, monitors and notebook computers. Moreover, although the present invention is applicable to all type of LCD displays, it is especially applicable to displays with large sizes including such sizes as 17 to 30 inches and beyond. It is contemplated that the size of the LCD displays can go as high as about 40 inches or more, which would benefit from the present invention. Also, for television applications (about 400 nits brightness) and applications where high brightness is needed, the present invention is especially helpful.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A back light for a liquid crystal display comprising:
   a first case having a plurality of first and second support members, the first case being associated with the liquid crystal display the first support members at ends of the case and the second support member at a center portion of the case; and
   a plurality of luminescent lamps having tubes supported by the first and second support members, having electrodes at both ends of the tubes,
   wherein the luminescent lamps are arranged alternately at left and right sides of the second support member.

2. The back light of claim 1, wherein the electrodes of the luminescent lamps supported by the second support member are arranged in a straight line.

3. The back light of claim 1, wherein the electrodes of the luminescent lamps supported by the second support member are arranged in a non-straight line.

4. The back light of claim 3, wherein the electrodes of the luminescent lamps supported by the second support member are arranged in a zigzag pattern.

5. The back light of claim 1, wherein the luminescent lamps are arranged so that boundary portion between the electrodes of the luminescent lamps supported by the second support member and the tubes is formed on a line.

6. The back light of claim 1, wherein the first and second support members include holes or recesses that receive the luminescent lamp.

7. The back light of claim 6, wherein the holes or recesses are formed entirely through the first and second support members.

8. The back light of claim 6, wherein the holes or recesses are formed short of sidewalls of the first and second support members.

9. The back light of claim 1, wherein the luminescent lamps have a length of about 400 mm.

10. The back light of claim 1, further comprising a light-scattering mechanism above the luminescent lamps.

11. The back light of claim 1, wherein the first and second support members are coated with a conductive material.

12. The back light of claim 1, wherein the second support member is electrically grounded.

13. The back light of claim 1, wherein the first case is coated with a light-reflecting material on an inner side.

14. The back light of claim 1, wherein the inner side of the first case is formed of a light-reflecting material.

15. The back light of claim 1, further comprising a second case including a first bars corresponding to the first support members and a second bar corresponding to the second support member.

16. The back light of claim 15, wherein the first and second bars include holes or recesses that receive the luminescent lamp.

17. The back light of claim 16, wherein the holes or recesses are formed entirely through the first and second bars.

18. The back light of claim 16, wherein the holes or recesses are formed short of sidewalls of the first and second bars.

19. The back light of claim 15, wherein the first and second bars are coated with a conductive material.

20. The back light of claim 15, wherein the second case is formed to connect the first bars to the second bar.

21. The back light of claim 1, wherein the back light is in a liquid crystal display monitor.

22. The back light of claim 1, wherein the back light unit is in a television having a liquid crystal display.

23. The back light of claim 1, wherein the back light unit is in a portable computer having a liquid crystal display.

24. The back light of claim 1, wherein a display of at least 17 inches includes the back light.

25. The back light of claim 1, wherein a display of at least 20 inches includes the back light.

26. The back light of claim 1, wherein a display of about 30 inches includes the back light.

27. A method of manufacturing a liquid crystal display device back light unit comprising:

forming a first case having a plurality of first and second support members, the first support members at ends of the case and the second support member at a center portion of the case; and forming a plurality of luminescent lamps having tubes supported by the first and second support members, having electrodes at both ends of the tubes, wherein the luminescent lamps are arranged alternately at left and right sides of the second support member thereby form liquid crystal display device back light unit.

28. The method of claim 27, wherein the electrodes of the luminescent lamps supported by the second support member are arranged in a straight line.

29. The method of claim 27, wherein the electrodes of the luminescent lamps supported by the second support member are arranged in a non-straight line.

30. The method of claim 29, wherein the electrodes of the luminescent lamps supported by the second support member are arranged in a zigzag pattern.

31. The method of claim 27, wherein the luminescent lamps are arranged so that boundary portion between the electrodes of the luminescent lamps supported by the second support member and the tubes is formed on a line.

32. The method of claim 27, further comprising forming a second case including a first bars corresponding to the first support members and a second bar corresponding to the second support member.

33. A method of manufacturing a liquid crystal display device including a back light unit comprising:

forming a first case having a plurality of first and second support members, the first support members at ends of the case and the second support member at a center portion of the case;

forming a plurality of luminescent lamps having tubes supported by the first and second support members, having electrodes at both ends of the tubes, wherein the luminescent lamps are arranged alternately at left and right sides of the second support member; and providing a liquid crystal display in front of the back light unit thereby forming the liquid crystal display device.

* * * * *

UNITED STATES PATENT AND TRADEMARK OFFICE
CERTIFICATE OF CORRECTION

PATENT NO.   : 6,939,020 B2
DATED        : September 6, 2005
INVENTOR(S)  : Lim, Moo Jong It is certified that error appears in the above-identified patent and that said Letters Patent is hereby corrected as shown below:

Title page,
Item [75], Inventor, should read -- Moo Jong Lim, Seoul (KR) --.

Signed and Sealed this

Twenty-fourth Day of January, 2006

JON W. DUDAS
*Director of the United States Patent and Trademark Office*